Sept. 4, 1934.   L. ACASIO   1,972,325
PLANTER
Filed Nov. 6, 1933   5 Sheets-Sheet 4
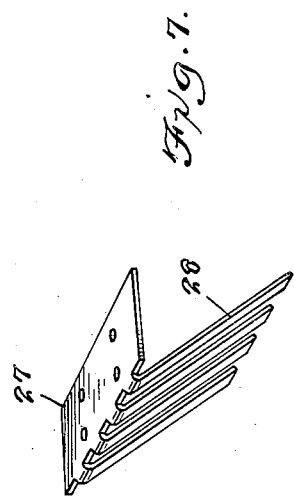
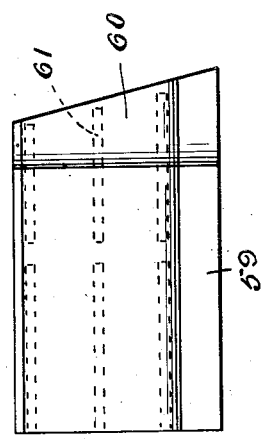
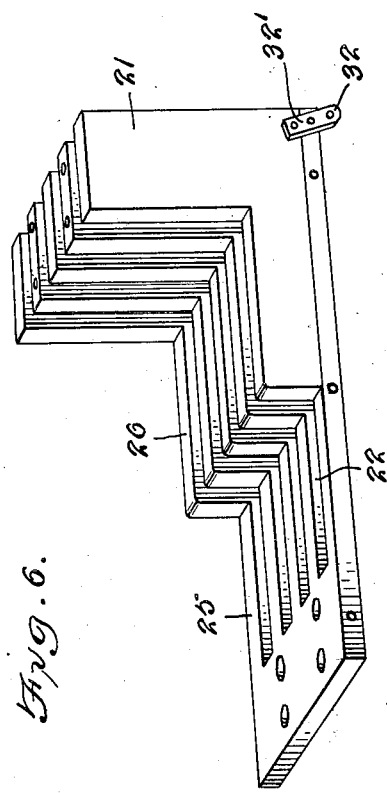
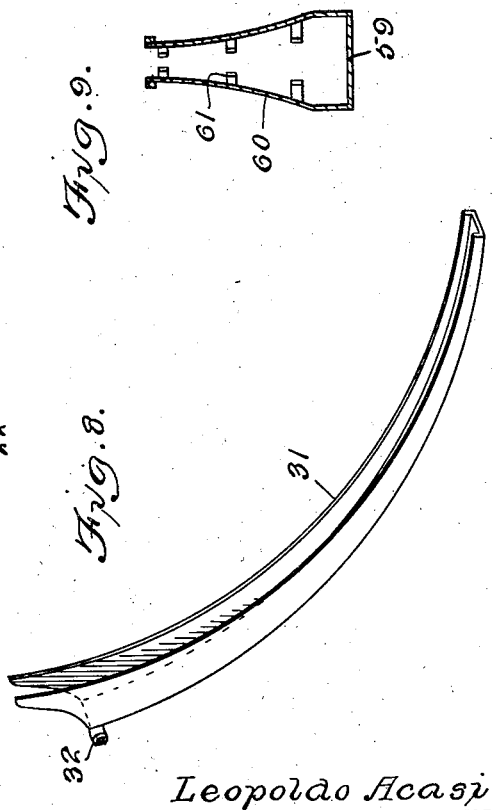
Leopoldo Acasio
INVENTOR
BY Victor J. Evans & Co.
ATTORNEY

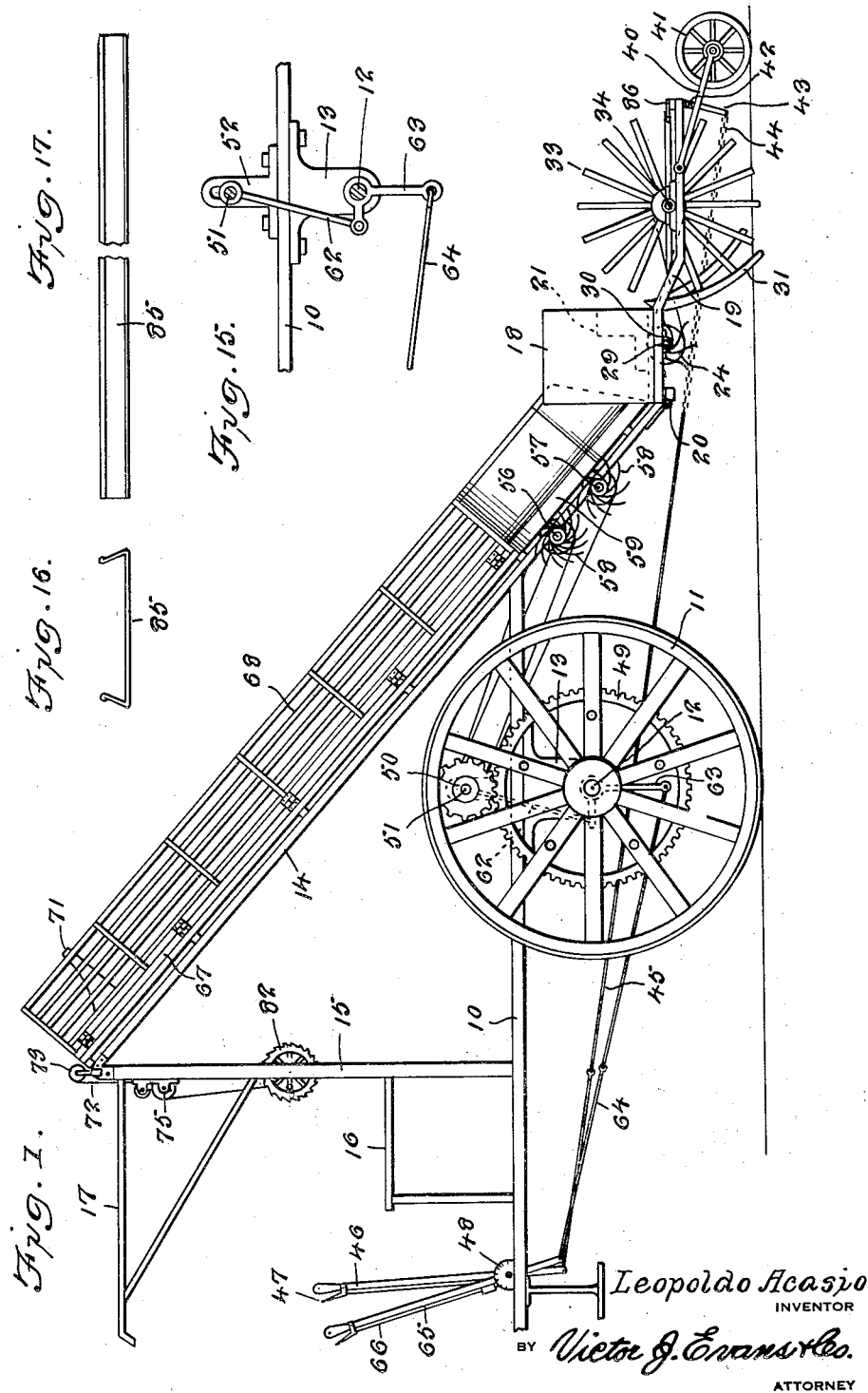

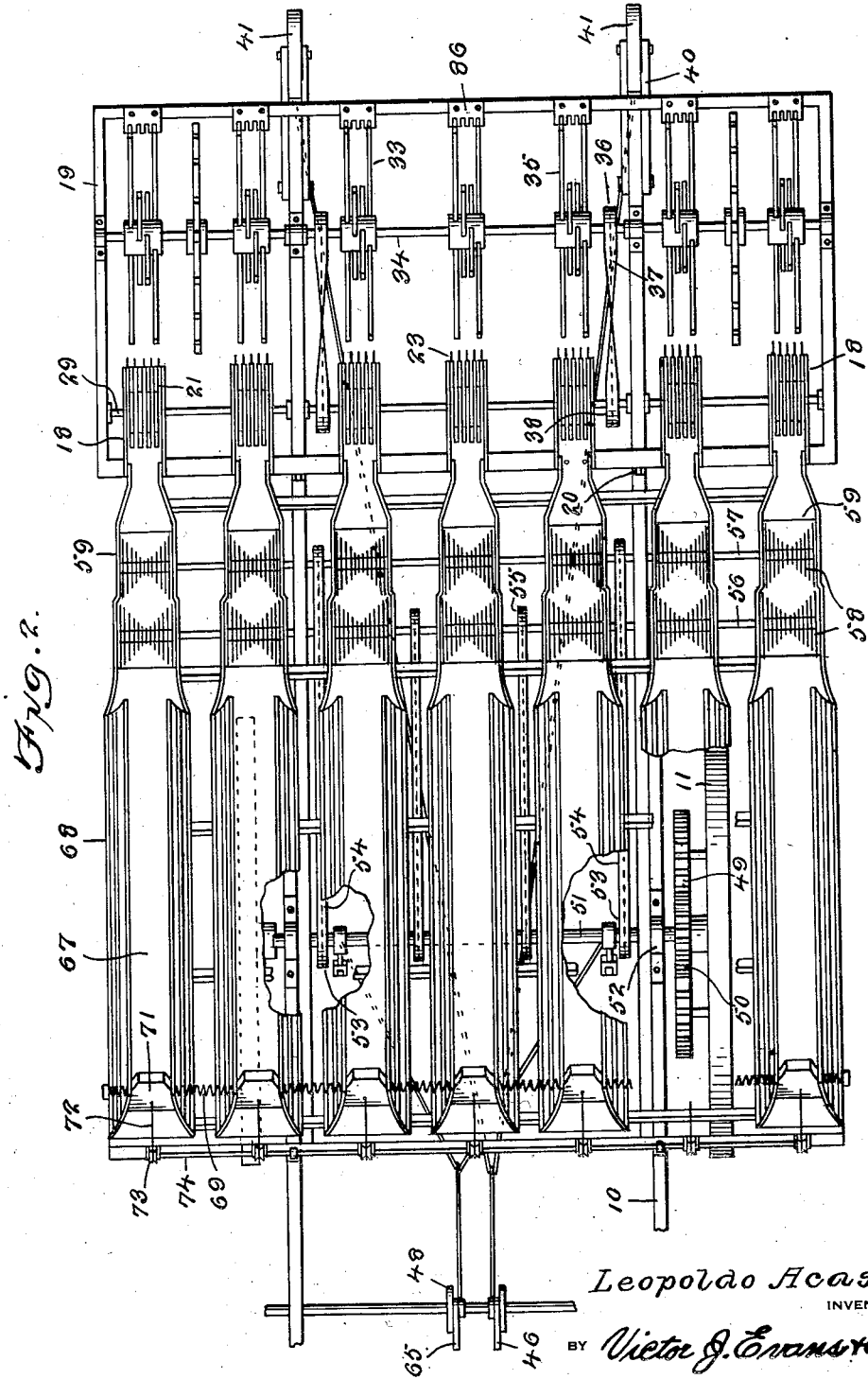

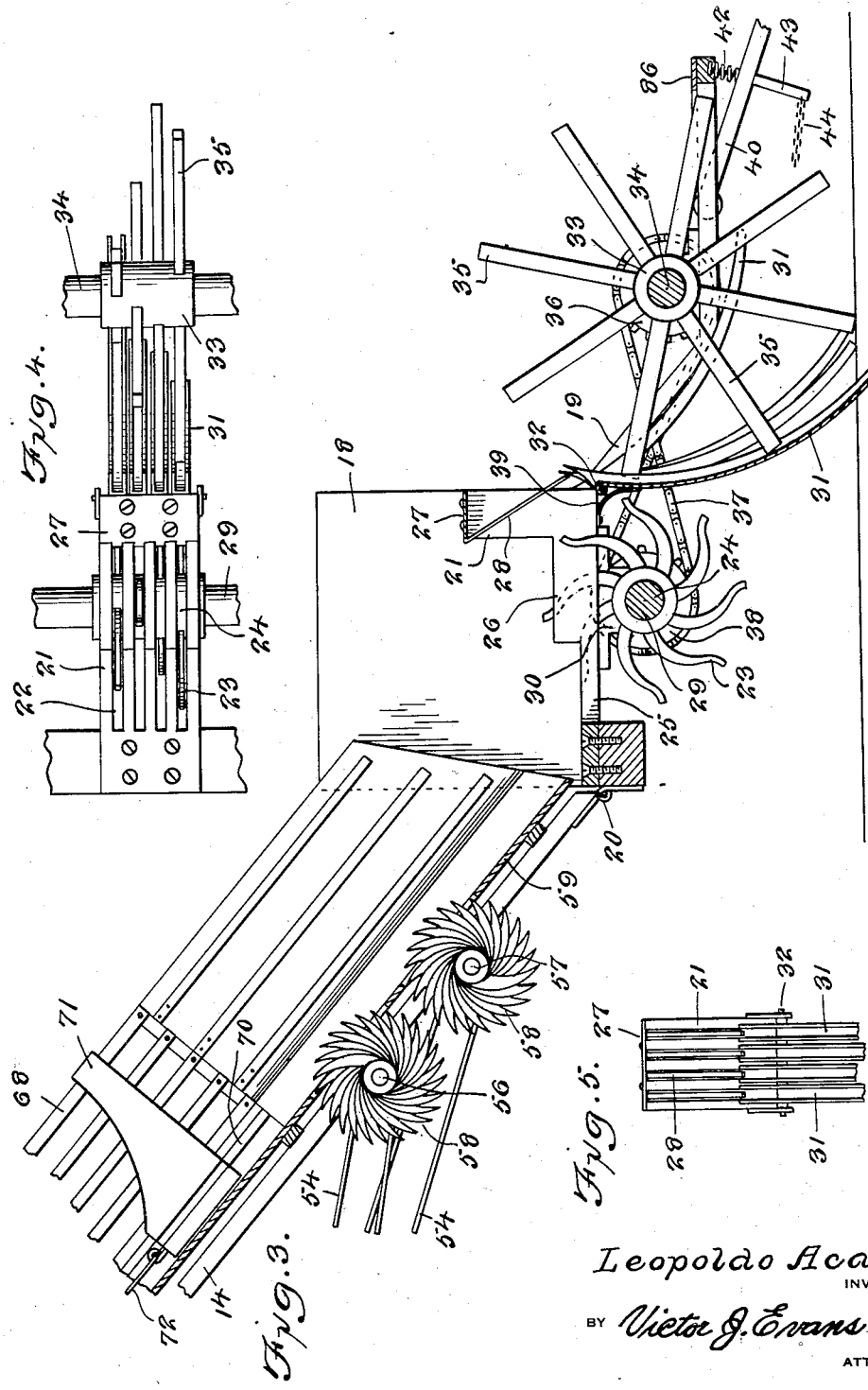

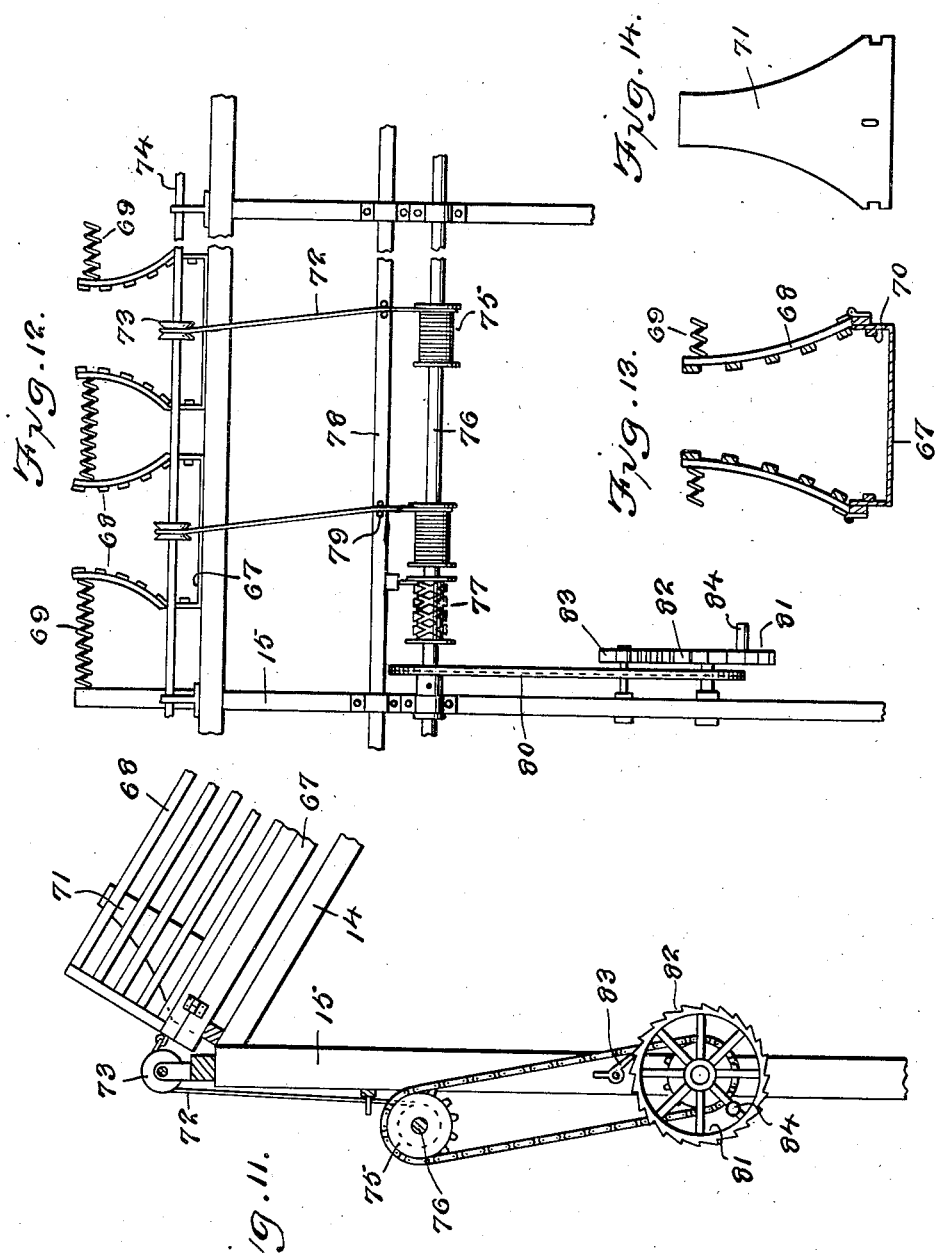

Patented Sept. 4, 1934

1,972,325

UNITED STATES PATENT OFFICE 1,972,325

PLANTER

Leopoldo Acasio, San Felipe, Zambales, Philippine Islands, assignor of twenty per cent to Honorato de Dios, San Narciso, Zambales, P. I., and ten per cent to Celedonio Senense, San Felipe, Zambales, P. I.

Application November 6, 1933, Serial No. 696,881

13 Claims. (Cl. 111—3)

The invention relates to a planter and more especially to rice seedling planters.

The primary object of the invention is the provision of a planter of this character, wherein rice seedlings will be automatically transplanted and thereby eliminating hand planting of the same, the planting operation being carried forth with dispatch and the plants neatly and uniformly arranged in the soil.

Another object of the invention is the provision of a machine of this character, wherein the rice plant constituting seedlings can be placed therein and through the instrumentality of mechanical parts will be handled so that the plants will be automatically transplanted uniformly and in a skillful manner, the machine in its entirety being of novel construction and automatic in its operation except in the placing of the plants in the machine for the transplanting of the same.

A further object of the invention is the provision of a machine of this character which is comparatively simple in its construction, thoroughly reliable and efficient in its operation, automatic in the working thereof, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a side elevation of a machine constructed in accordance with the invention.

Figure 2 is a fragmentary top plan view thereof.

Figure 3 is a fragmentary enlarged vertical longitudinal sectional view through the machine.

Figure 4 is a fragmentary detail plan view.

Figure 5 is a fragmentary elevation looking toward the front of that portion of the machine shown in Figure 4.

Figure 6 is a perspective view of the plant delivery section of the machine.

Figure 7 is a perspective view of the director member of the delivery section.

Figure 8 is a perspective view of one of the depositing spouts of the machine.

Figure 9 is a vertical transverse sectional view through the chute of the machine for the plants.

Figure 10 is a side elevation thereof.

Figure 11 is a fragmentary side elevation partly in section of the follower control for the machine.

Figure 12 is a fragmentary front elevation thereof.

Figure 13 is a fragmentary vertical transverse sectional view through one of the plant troughs of the machine.

Figure 14 is an elevation of one of the followers for the plant trough.

Figure 15 is a fragmentary detail plan view of a gear control for the machine.

Figure 16 is an end elevation of a plant carrier for use with the machine.

Figure 17 is a side elevation thereof.

Similar reference characters indicate corresponding parts throughout the several views in the drawings.

Referring to the drawings in detail, the present invention embodies a farm implement, particularly a machine to plant rice seedlings, and comprises a wheeled chassis 10, the traction wheels 11 for the same being upon a supporting axle 12 mounted in bearings 13 fixedly depending from the chassis 10 which is elevated the required distance from a ground surface. The chassis 10 supports an inclined frame 14 which, at its uppermost end, is united with vertical uprights 15, these rising from the chassis 10, a seat 16 being arranged next to said uprights 15, while above the seat is a suitable canopy 17 for the occupant of the seat 16 and serving as the operator or attendant of the machine.

Arranged at the lowermost end of the frame 14 is a seedling delivery box 18 which is carried by an auxiliary frame 19 hinged at 20 to the lower end of said frame 14. This seedling box 18 has arranged therein a stepped delivery section or rack 21 having the spaced parallel longitudinally directed delivery slots 22 therein, through which operate the curved blades 23 of feeder wheels 24, these blades 23 being movable through the lowermost and intermediate steps 25 and 26, respectively, of the section 21, while the uppermost or higher remaining step of the said section 21 has fixed thereon the plate portion 27 of resilient guide or director fingers 28, these being inclined rearwardly and disposed within the slots 22 in said section 21. The wheels 24 are carried by a driven shaft 29 suitably journaled in bearings 30 carried at the underside of the frame 19, the blades 23 of the said wheels 24 being circumferentially disposed and spaced the required distance from each other.

At the higher stepped side of the section 21 is arranged a series of curved depositing spouts 31, each being tapered and at its larger end is swingingly supported by a pintle or pivot 32 common to the series of said spouts 31 and supported in hangers 32' carried by the section 21. The spouts 31 confront the slots 22 in the section 21 and are adapted to receive plants or seedlings therefrom for transplanting in the soil or ground, the plants being fed to the spouts under the action of the blades 23 of the wheels 24, as should be apparent in Figure 3 of the drawings.

Coacting with the spouts 31 is a spoked transplanting wheel 33 supported by an axle 34 journaled in the frame 19, the spokes 35 of this wheel being paired, radially disposed and diametrically opposite for the respective spouts 31. The axle 34 of the wheel 35 has thereon a sprocket gear 36 over which is trained a sprocket chain 37, the stretches of which are reversed and trained over a sprocket gear 38 on the shaft 29 for the wheels 24 so that the latter will be rotated reversely to the rotation of the wheel 33 and the latter imparts power to said wheels 24 by contact of the free ends of the spokes 35 with the soil or ground surface. Each spout 31 under the action of the springs 39 is urged in the direction of the wheel 33, the spokes 35 for the respective spouts 31, on the turning of the wheel 33, working within the said spouts to draw the seedlings therefrom in a perpendicular position and transplanting them in the soil or ground during the advancement of the machine thereover.

The auxiliary frame 19 has swingingly connected therewith a pair of trailer wheel hangers 40 having journaled therein trailer wheels 41, these hangers 40 acting against buffer springs 42 on the frame 19. Also the hangers carry brackets 43 with which are connected chains 44, these, through the links 45, being connected with a throw lever 46 swingingly supported upon the chassis 10 and carrying a hand released latch 47 coacting with a sector 48, whereby the lever 46 can be latched in its thrown or adjusted position. On movement of the lever 46 in one direction the hangers 40 will be shifted so that the rear end of the machine will be elevated and the trailer wheels 41 having traction upon the ground whereby the transplanting wheel 33 will be inactive and the machine readily shifted from one locality to the other while passive or inactive for transplanting purposes.

Carried by the wheels 11 are gears 49 with which are adapted to mesh companion gears 50, these carried by a shaft 51 vertically movable in guides 52 on the chassis 10 so that the said gears 50 can be brought into and out of mesh with the gears 49 at the will of the operator of the machine.

The shaft 51 carries sprocket wheels 53 over which are trained sprocket chains 54, these being trained over suitable sprocket wheel 55 fixed to the respective shafts 56 and 57, these being equipped with bladed combing wheels 58 operating through plant troughs 59 supported by the frame 14 next to the box 18 and communicative therewith. Each trough 59 has inwardly curved upwardly convergent sides 60 carrying at their inner faces resilient or spring presser fingers 61 which operate upon the seedlings to hold the same when passing through the troughs 59 in upright position so that the combing wheels 58 will act upon the trunk and roots of such plants for combing and straightening action thereon for reception in the box 18 to be acted upon by the feeder wheels 24 therein.

The shaft 51 carrying the gears 50 will be lifted by links 62 operated upon through bell crank levers 63 supported upon the axle 12 for the wheels 11, the short arm of each bell crank lever being pivoted to its companion link 62, while the long arm of said lever has connected therewith a throw rod 64, the latter being operated by a throw lever 65 swingingly supported in the chassis 10 and carrying a hand releasable latch 66 operating with a keeper segment not shown and alike to 48. Thus, by operating the lever 65, the gears 50 can be thrown into or out of mesh with the gears 49 for rendering the combing wheels 59 active or inactive, as should be apparent. The levers 46 and 65 are located on the chassis 10 convenient for reach by the occupant of the seat 16 upon said chassis.

The frame 14 has thereon chutes 67, these communicative with the troughs 59 and each chute is equipped with inwardly curved hinged slatted side guards 68 tensioned by springs 69 active thereon. This chute carries tracks 70 for a follower 71 working within said chute to advance the seedlings, when deposited within the chute, to the troughs 59 for action of the combing wheels 58.

The followers, which are suitably weighted, are retracted or raised from advancing position in the chutes 67 by lifting cables 72 connected therewith and operating over guide pulleys 73 upon a supporting shaft 74 suitably journaled upon the uprights 15 at the upper open ends of the chutes 67. The cables 72 are adapted to be wound on and unwound from windlasses 75 upon a rotary shaft 76, the latter carrying a reversing screw drum 77 actuating a shifting bar 78 carrying the cable guides 79 so that the said cables when being wound upon the windlass 75 will be properly guided thereto for the even winding or coiling thereon. The shaft 76 is driven through gear and chain connection 80 with a hand operated wheel 81 formed at its periphery with ratchet teeth 82 engaged by a keeper dog 83 so that the said wheel 81 can be turned in one direction and latched against reverse turning thereof except when releasing the dog 83 from the ratchet teeth 82, the dog being pivoted for this purpose and manually released at the will of the operator of the wheel 81. The wheel carries a turning handle 84 for convenience of the operator.

Adapted for the introduction of plants within the machine, that is, within the chutes, there is provided for each a plant carrier 85, the same being shown in detail in Figures 16 and 17 and when such carrier is loaded with plants or seedlings the same is introduced into the chute 67, it being understood, of course, that the follower 71 in this chute is removed therefrom for the complete introduction of said carrier 85 and thereafter the carrier is pulled outwardly from the chute into which it is introduced, depositing the plants in the chute, whereupon the follower is replaced in the chute so as to advance these plants, which are in upright or standing position within the chute, into the trough 59 common to said chute so that the plants will be straightened and combed at the roots and trunk thereof for subsequent delivery to the box 18, whence the feeder wheel 24 operating therein will carry the plant or plants to the spout 31, these plants being fed successively and delivered through the slots 22 in the delivery section 21 to said spout, whence they will be transplanted under the working of the transplanting wheel 33, as should be clearly apparent in Figure 3 of the drawings.

The machine may be mechanically or animal drawn and can be of any required size consistent with the requirement for transplanting seedlings or rice plants according to the planting acreage domained by the user of the machine.

The auxiliary frame 19 has thereon mud scrapers 86 for the spokes 35 of the transplanting wheel 33, the trailer wheels 41 being normally in trailing position for the penetration of the said spokes 35 of the transplanting wheels 33 in the soil or ground, as will be apparent from Figure 1 of the drawings.

It should be obvious that the sides 60 of the troughs 59 and the guards 68 of the chutes 67 will maintain the seedlings or rice plants in upright position as the same are advanced through the machine for transplanting thereof, while the combing wheels 58 will separate the plants during advancement thereof, as well as condition the same for transplanting.

What is claimed is:

1. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, and feeder wheels working within said delivery box.

2. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, and means hinging the delivery box with the inclined frame.

3. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, and chutes upon the inclined frame for feeding seedlings to the troughs.

4. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, and followers working within said chutes.

5. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, and manually operated means for retracting the followers within the chutes.

6. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, and connections between the spoked planting wheel and said feeder wheels.

7. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, and connections between the wheels of the chassis and the combing wheels.

8. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, connections between the wheels of the chassis and the combing wheels, and means for separating the last-named connections and manually operated.

9. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, connections between the wheels of the chassis and the combing wheels, means for separating the last-named connections and manually operated, and means for actuating the trailer wheel to lift the planting wheel from the ground.

10. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, connections between the wheels of the chassis and the combing wheels, means for separating the last-named connections and manually operated, means for actuating the trailer wheel to lift the planting wheel from the ground, and means for slidably mounting the followers in the chutes.

11. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, connections between the wheels of the chassis and the combing wheels, means for separating the last-named connections and manually operated, means for actuating the trailer wheel to lift the planting wheel from the ground, means for slidably mounting the followers in the chutes, and inwardly curved upwardly convergent sides on said troughs and having spring presser fingers.

12. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, connections between the wheels of the chassis and the combing wheels, means for separating the last-named connections and manually operated, means for actuating the trailer wheel to lift the planting wheel from the ground, means for slidably mounting the followers in the chutes, inwardly curved upwardly convergent sides on said troughs and having spring presser fingers, and director fingers arranged within the seedling delivery box.

13. An implement of the character described comprising a wheeled chassis, an inclined frame carried by said chassis, a seedling delivery box at the lower end of the frame, depositing spouts swingingly carried by said box and communicative therewith, an auxiliary frame projected from said box, a spoked planting wheel journaled in said auxiliary frame and having its spokes working in the spouts to draw seedlings therefrom in a perpendicular direction, a trailer wheel connected with said auxiliary frame, troughs on said inclined frame and leading into the box, bladed combing wheels working within the troughs, feeder wheels working within said delivery box, means hinging the delivery box with the inclined frame, chutes upon the inclined frame for feeding seedlings to the troughs, followers working within said chutes, connections between the spoked planting wheel and said feeder wheels, connections between the wheels of the chassis and the combing wheels, means for separating the last-named connections and manually operated, means for actuating the trailer wheel to lift the planting wheel from the ground, means for slidably mounting the followers in the chutes, inwardly curved upwardly convergent sides on said troughs and having spring presser fingers, director fingers arranged within the seedling delivery box, and spring tensioned guards hinged to said chutes at opposite sides thereof.

LEOPOLDO ACASIO.